(12) United States Patent
Portwood et al.

(10) Patent No.: US 12,135,915 B2
(45) Date of Patent: Nov. 5, 2024

(54) VIRTUAL UNIVERSAL SERIAL BUS INTERFACE

(71) Applicant: Shure Acquisition Holdings, Inc., Niles, IL (US)

(72) Inventors: Jonathan Portwood, Vernon Hills, IL (US); Jingan Pei, Suzhou (CN); Kehang Wu, Wilmette, IL (US); Mathew T. Abraham, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 180 days.

(21) Appl. No.: 17/451,756

(22) Filed: Oct. 21, 2021

(65) Prior Publication Data

US 2022/0121416 A1 Apr. 21, 2022

Related U.S. Application Data

(60) Provisional application No. 63/094,667, filed on Oct. 21, 2020.

(51) Int. Cl.
*H04M 3/00* (2024.01)
*G06F 3/16* (2006.01)
(Continued)

(52) U.S. Cl.
CPC .............. *G06F 3/162* (2013.01); *G06F 3/165* (2013.01); *G06F 13/4282* (2013.01);
(Continued)

(58) Field of Classification Search
CPC . H04L 65/752; H04L 65/403; H04L 65/1101; H04L 63/0428; H04L 65/70;
(Continued)

(56) References Cited

U.S. PATENT DOCUMENTS 7,339,503 B1 * 3/2008 Elenes ............... H03H 17/0027
381/104
8,972,624 B2 3/2015 Kanigicherla
(Continued)

FOREIGN PATENT DOCUMENTS

CN 103678230 3/2014
CN 103873711 6/2014
(Continued)

OTHER PUBLICATIONS

International Search Report and Written Opinion for PCT/US2021/071974 dated Feb. 25, 2022, 10 pp.
(Continued)

*Primary Examiner* — Kharye Pope
(74) *Attorney, Agent, or Firm* — Neal, Gerber & Eisenberg LLP

(57) ABSTRACT

A virtual USB interface can enable a software module, e.g., conferencing software, to interface with a software audio endpoint as if the software audio endpoint were a physical USB endpoint. Signals conforming to the USB standard can be transceived and adapted to and from non-USB signals using the virtual USB interface. Both the signals conforming to the USB standard and the non-USB signals may include a media channel and/or a control channel.

28 Claims, 6 Drawing Sheets

(51) Int. Cl.
  *G06F 13/42* (2006.01)
  *G10L 21/0232* (2013.01)
  *H04L 12/66* (2006.01)
  *H04L 67/00* (2022.01)
  *H04M 5/00* (2006.01)
  *G10L 21/0208* (2013.01)

(52) U.S. Cl.
  CPC .......... *G10L 21/0232* (2013.01); *H04L 67/34* (2013.01); *G06F 2213/0042* (2013.01); *G10L 2021/02082* (2013.01)

(58) Field of Classification Search
  CPC . H04L 65/61; H04L 65/1069; H04L 65/1095; H04L 65/611; H04L 65/80; H04L 43/087; H04L 65/65; H04L 65/756; H04N 7/15; H04N 7/147; H04N 7/157; H04N 7/152; G06F 3/0482; G06F 3/04817; G06F 3/04842; G06F 3/017; G06F 2203/0384; G06F 3/167; H04M 3/567; H04M 3/568; H04M 2201/42; H04M 2201/60
  USPC .................. 710/313, 63, 305, 100; 370/260; 709/253
  See application file for complete search history.

(56) References Cited

U.S. PATENT DOCUMENTS

| | | | |
|---|---|---|---|
| 9,418,181 | B2 | 8/2016 | Myrick |
| 10,067,891 | B2 | 9/2018 | Venkatesh |
| 10,078,609 | B1 | 9/2018 | Raju |
| 10,142,425 | B2 | 11/2018 | Vajravel |
| 10,419,567 | B2 | 9/2019 | Chiu |
| 2006/0104397 | A1* | 5/2006 | Lottis .................. H04N 21/4392 375/372 |
| 2006/0147029 | A1* | 7/2006 | Stokes, III ............ H04M 9/082 379/406.01 |
| 2007/0019802 | A1* | 1/2007 | Ubriaco ................ H04M 9/082 379/406.01 |
| 2010/0069006 | A1* | 3/2010 | Baek ...................... H04L 47/58 455/41.3 |
| 2012/0253491 | A1* | 10/2012 | Miyata ............. G11B 20/10527 700/94 |
| 2013/0013841 | A1* | 1/2013 | Jensen .................. G06F 13/385 710/313 |
| 2013/0097244 | A1* | 4/2013 | Manley .................... H04L 51/56 709/204 |
| 2013/0155169 | A1* | 6/2013 | Hoover .................. H04N 7/157 348/E7.083 |
| 2014/0148934 | A1* | 5/2014 | Manley .................... H04M 3/42 700/94 |
| 2014/0274004 | A1* | 9/2014 | Koll .................... H04M 1/6033 455/416 |
| 2016/0224493 | A1 | 8/2016 | Wang |
| 2016/0323201 | A1* | 11/2016 | Choen .................... H04L 65/80 |
| 2017/0289313 | A1* | 10/2017 | Vajravel ................ G06F 13/385 |
| 2017/0318142 | A1* | 11/2017 | Skjoldborg ........... H04W 76/14 |
| 2018/0227347 | A1 | 8/2018 | Rombakh |
| 2019/0281147 | A1* | 9/2019 | Sherburne ............. H02J 7/0042 |
| 2019/0349471 | A1* | 11/2019 | Ferguson ............... H04M 3/002 |
| 2019/0385629 | A1 | 12/2019 | Moravy |
| 2022/0004508 | A1* | 1/2022 | Kumar ................ G06F 13/4282 |

FOREIGN PATENT DOCUMENTS

| | | |
|---|---|---|
| CN | 108804068 | 11/2018 |
| CN | 110278089 | 9/2019 |
| WO | 2013000213 | 1/2013 |

OTHER PUBLICATIONS

Intellimix Room, Audio Processing Software, Web page https://www.shure.com/en-US/products/software/intellimix_room, 7 pages, Apr. 22, 2020, retrieved from Internet Archive Wayback Machine, <https://web.archive.org/web/20200422122931/https://www.shure.com/en-US/products/software/intellimix_room> on Nov. 5, 2021.

Poly Virtual USB Connector, Information Sheet, Plantronics, Inc., Oct. 9, 2019, 2 pp.

Virtual USB. Access Virtual USB port from anywhere, Flexihub, Web page https://www.flexihub.com/virtual-usb/, 8 pages, downloaded Nov. 5, 2021.

* cited by examiner

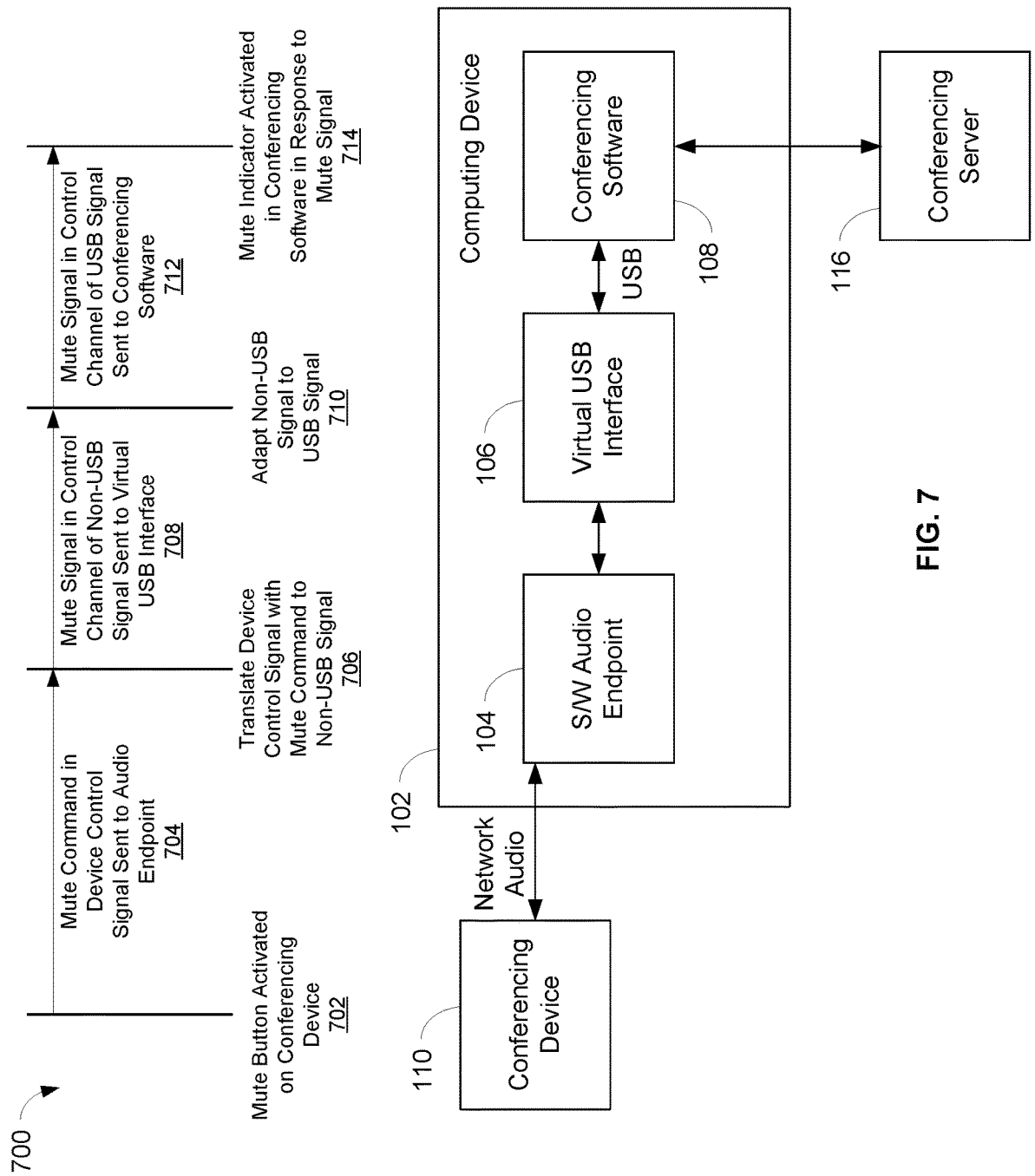

VIRTUAL UNIVERSAL SERIAL BUS INTERFACE

CROSS-REFERENCE TO RELATED APPLICATIONS

This application claims the benefit of U.S. Provisional Patent Application No. 63/094,667, filed Oct. 21, 2020, which is fully incorporated by reference in its entirety herein.

TECHNICAL FIELD

This application generally relates to a software-based Universal Serial Bus (USB) interface. In particular, this application relates to a virtual USB interface that can transceive and adapt signals conforming to the USB standard to and from non-USB signals between a software module and a software endpoint.

BACKGROUND

Conferencing environments, such as conference rooms, boardrooms, video conferencing settings, and the like, typically involve the use of a discrete conferencing device comprising one or more microphones for capturing sound from various audio sources active in such environments. The audio sources may include in-room human speakers, and in some cases, loudspeakers playing audio received from human speakers that are not in the room, for example. The captured sound may be disseminated to a local audience in the environment through amplified speakers (for sound reinforcement), and/or to others remote from the environment (such as, e.g., a via a telecast and/or webcast) using communication hardware included in or connected to the conferencing device. The conferencing device may also include one or more speakers or audio reproduction devices for playing out loud audio signals received, via the communication hardware, from the human speakers that are remote from the conferencing environment. Other hardware included in a typical conferencing device may include, for example, one or more processors, a memory, input/output ports, and user interface/controls.

Conferencing devices are available in a variety of sizes, form factors, mounting options, and wiring options to suit the needs of particular environments. The type of conferencing device and its placement in a particular conferencing environment may depend on the locations of the audio sources, physical space requirements, aesthetics, room layout, and/or other considerations. For example, in some environments, the conferencing device may be placed on a table or lectern to be near the audio sources. In other environments, the microphones for a given conference device may be mounted overhead to capture the sound from the entire room, for example.

Conferencing software (e.g., Microsoft Teams, Zoom, Skype, BlueJeans, Cisco WebEx, GoToMeeting, Join.me, etc.) may be in communication with a conferencing device in an environment to allow communication between local near end participants and remote far end participants during conference calls, meetings, etc. For example, the conferencing software can receive far end audio signals that can be played back to the local participants, and can transmit audio signals from the near end to the remote participants. The conferencing software may be stored and be executed on a computing device, and may be considered an audio/visual software codec, e.g., software for compressing and decompressing the audio and/or video data of a conference.

Various physical endpoints can interface with the conferencing software for audio and video input/output. The physical endpoints can include, for example, microphones, cameras, headsets, and hardware digital signal processing devices. The physical endpoints may interface with the conferencing software via a physical USB connection with the computing device. Some physical endpoints may be considered a USB composite class device, such that audio signals (i.e., USB audio class) and control signals (i.e., USB Human Interface Device (HID) class) can be communicated between the conferencing software and the physical endpoints.

Software-based endpoints executable on computing devices also exist that can interface with conferencing software for audio and video input/output. A software audio endpoint, in particular, may include digital signal processing (DSP) components that can process audio signals using, for example, automatic mixing, matrix mixing, delay, compressor, and parametric equalizer (PEQ) functionalities. Existing software endpoints can typically interface with conferencing software through an audio device driver and various application programming interfaces (APIs) on a computing device. The audio device driver can be configured to enable the software endpoint and/or the audio device driver to present itself as a standard operating system audio device, which can be selectable as an input/output device in the conferencing software.

However, it may be undesirable, inconvenient, or impossible for some conferencing software to interface with software endpoints via an audio device driver through the operating system, particularly for communication of control signals. Such control signals may include, for example, signals related to muting states, light indicator states, and identifying the functionality of the software endpoint (e.g., DSP or AEC capability). For example, it is typically not possible for conferencing software to communicate control signals with a software endpoint via an audio device driver. As another example, other conferencing software may not support connecting to an audio device driver through the operating system of the computing device for communication of control signals. In this situation, it may be awkward or difficult for the conferencing software to support multiple control mechanisms.

Accordingly, it would be advantageous to have a virtual USB interface that could transceive and adapt signals conforming to the USB standard to and from non-USB signals, in order to enable a software module to interface with a software audio endpoint as if the software audio endpoint were a physical endpoint.

SUMMARY

The invention is intended to solve the above-noted problems by providing a virtual USB interface that is designed to, among other things: (1) transceive a signal conforming to the USB standard with a software module, such as a conferencing software module; (2) adapt the signal conforming to the USB standard to and from a non-USB signal, where the signals may include one or more of a media channel or a control channel; and (3) transceive the non-USB signal with a software audio endpoint.

In an embodiment, a method that is executable on a computing device includes receiving a first signal conforming to a Universal Serial Bus (USB) standard at a virtual USB interface from conferencing software; adapting, using the virtual USB interface, the first signal conforming to the USB standard to a first non-USB signal; and transmitting the first non-USB signal from the virtual USB interface to audio processing software. The audio processing software may include an acoustic echo cancellation component.

In another embodiment, a computing device may include at least one processor configured to receive a first non-Universal Serial Bus (USB) signal from audio processing software; adapt the first non-USB signal to a first signal conforming to a USB standard; and transmit the first signal conforming to the USB standard to conferencing software. The audio processing software may include an acoustic echo cancellation component.

In a further embodiment, a conferencing system may include one or more processors, and one or more conferencing devices configured to capture and play sound. The one or more processors may be configured to receive, at conferencing software from at least one remote server, a remote audio signal; receive, at a virtual Universal Serial Bus (USB) interface from the conferencing software, a signal conforming to a USB standard; and adapt, using the virtual USB interface, the signal conforming to the USB standard to a non-USB signal. The signal conforming to the USB standard may include the remote audio signal. The one or more processors may be further configured to transmit, from the virtual USB interface to audio processing software, the non-USB signal; process, using the audio processing software, the non-USB signal into an audio signal; and transmit, from the audio processing software to the one or more conferencing devices, the audio signal to cause the one or more conferencing devices to play the sound of the audio signal.

In an embodiment, a method that is executable on a computing device includes transceiving a signal conforming to a Universal Serial Bus (USB) standard at a virtual USB interface with a conferencing software module; adapting the signal conforming to the USB standard with the virtual USB interface to and from a non-USB signal; and transceiving the non-USB signal at the virtual USB interface with a software audio endpoint. The software audio endpoint may include one or more of a digital signal processing component or an acoustic echo cancellation component. The virtual USB interface, the software audio endpoint, and the conferencing software module may be stored on the computing device.

In another embodiment, a method that is executable on a computing device includes transceiving a signal conforming to a USB standard at a virtual USB interface with a software module; adapting the signal conforming to the USB standard with the virtual USB interface to and from a non-USB signal; and transceiving the non-USB signal at the virtual USB interface with audio software. The virtual USB interface, the audio software, and the software module may be stored on the computing device.

In a further embodiment, a system includes one or more processors, at least one memory, and a plurality of programs stored in the at least one memory and configured to be executed by the one or more processors. The plurality of programs may include a software module, a software endpoint, and a virtual USB interface. The virtual USB interface may be configured to transceive a signal conforming to a USB standard with the software module; adapt the signal conforming to the USB standard to and from a non-USB signal; and transceive the non-USB signal with the software endpoint.

In another embodiment, a software-based virtual USB interface may be configured to transceive a signal conforming to a USB standard with a conferencing software module; adapt the signal conforming to the USB standard to and from a non-USB signal; and transceive the non-USB signal with a software audio endpoint, the software audio endpoint comprising one or more of a digital signal processing component or an acoustic echo cancellation component. The virtual USB interface, the software audio endpoint, and the conferencing software module may be stored on a computing device.

In a further embodiment, a conferencing system may include one or more processors; at least one memory; one or more near end audio devices configured to capture near end audio signals; and a plurality of programs stored in the at least one memory and configured to be executed by the one or more processors. The plurality of programs may include a conferencing software module configured to receive far end audio signals from at least one remote server; a software audio endpoint comprising one or more of a digital signal processing component or an acoustic echo cancellation component; and a virtual USB interface. The virtual USB interface may be configured to transceive a signal conforming to a USB standard with the conferencing software module; adapt the signal conforming to the USB standard to and from a non-USB signal; and transceive the non-USB signal with the software audio endpoint.

In another embodiment, a software-based virtual adaptation interface may be configured to adapt a standards-based communications signal of a first component to and from another communications signal of a second component. The standards-based communications signal may include control signals for controlling a human interface device. The interface, the first component, and the second component may be stored and executable on a computing device.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 7 is a diagram illustrating another exemplary signal flow between components of the conferencing system of FIG. 1, in accordance with some embodiments.

DETAILED DESCRIPTION

Figure 1:
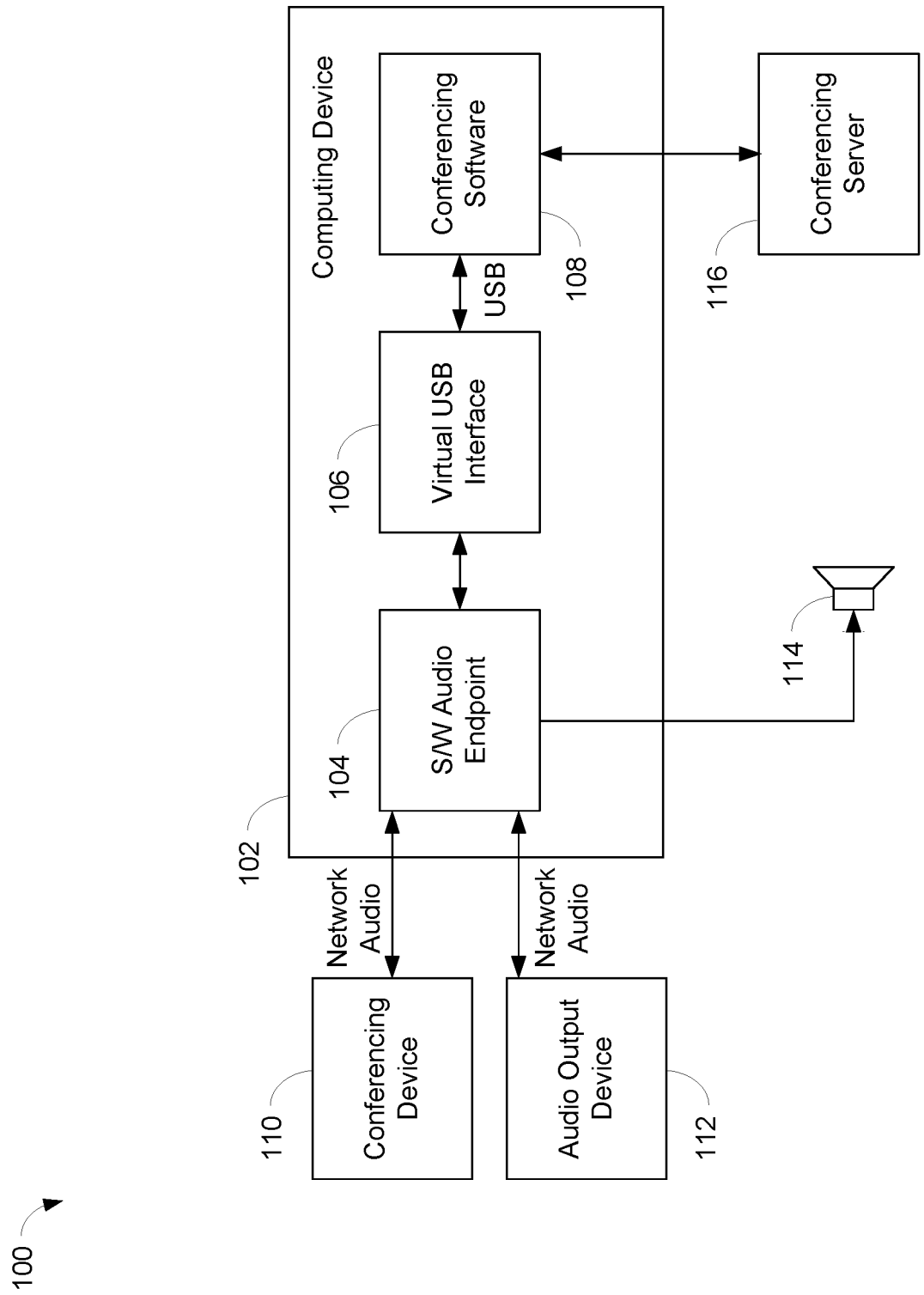
FIG. 1 is a block diagram of an exemplary conferencing system including a virtual USB interface, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The virtual USB interface as described herein can enable a software module, e.g., conferencing software, to interface with a software audio endpoint as if the software audio endpoint were a physical USB endpoint. Through use of the virtual USB interface, signals conforming to the USB standard can be transceived and adapted to and from non-USB signals. In particular, the virtual USB interface can receive and transmit signals conforming to the USB standard with the software module, adapt the signals conforming to the USB standard to and from the non-USB signals, and receive and transmit the non-USB signals with the software audio endpoint. Both the signals conforming to the USB standard and the non-USB signals may include a media channel and/or a control channel. The software module, the virtual USB interface, and the software audio endpoint may be stored and executable on the same computing device, in embodiments.

The media channel may include audio signals related to a conference call or meeting, for example. In embodiments, the media channel may include video signals. In embodiments, the control channel may include signals related to USB Human Interface Device commands, signals related to firmware and software updates of the software audio endpoint, or other standard USB-compliant signals. For example, the control channel may include signals related to muting states, light indicator states, and identifying the functionality of the software endpoint (e.g., DSP or AEC capability). In embodiments, functionality of the software endpoint can be communicated over the control channel to conferencing software such that the conferencing software disables similar functionality to avoid redundancies. The virtual USB interface may be configured to appear as a USB composite class device to the software module. Through use of the virtual USB interface, the configuration of and communication between the software modules and the software audio endpoints can be improved and optimized.

FIG. 1 is a block diagram of an exemplary conferencing system 100 including a virtual USB interface 106 that can transceive signals conforming to the USB standard with conferencing software 108, adapt the USB signals to and from non-USB signals, and transceive the non-USB signals with a software audio endpoint 104. In embodiments, the software audio endpoint 104, the virtual USB interface 106, and the conferencing software 108 may be stored and executable on a computing device 102. It is also possible and contemplated that the virtual USB interface 106 can respectively transceive and adapt USB signals and non-USB signals with a suitable software module (in lieu of the conferencing software 108) and with suitable audio software (in lieu of the software audio endpoint 104).

The conferencing system 100 may be utilized in a conferencing environment, such as, for example, a conference room, a boardroom, or other meeting room where the audio source includes one or more human speakers. Other sounds may be present in the environment which may be undesirable, such as noise from ventilation, other persons, audio/visual equipment, electronic devices, etc. In a typical situation, the audio sources may be seated in chairs at a table, although other configurations and placements of the audio sources are contemplated and possible, including, for example, audio sources that move about the room. One or more microphones may be placed on a table, lectern, desktop, etc. in order to detect and capture sound from the audio sources, such as speech spoken by human speakers. One or more loudspeakers may be placed on a table, desktop, ceiling, wall, etc. to play audio signals received from audio sources that are not present in the room.

Figure 6:
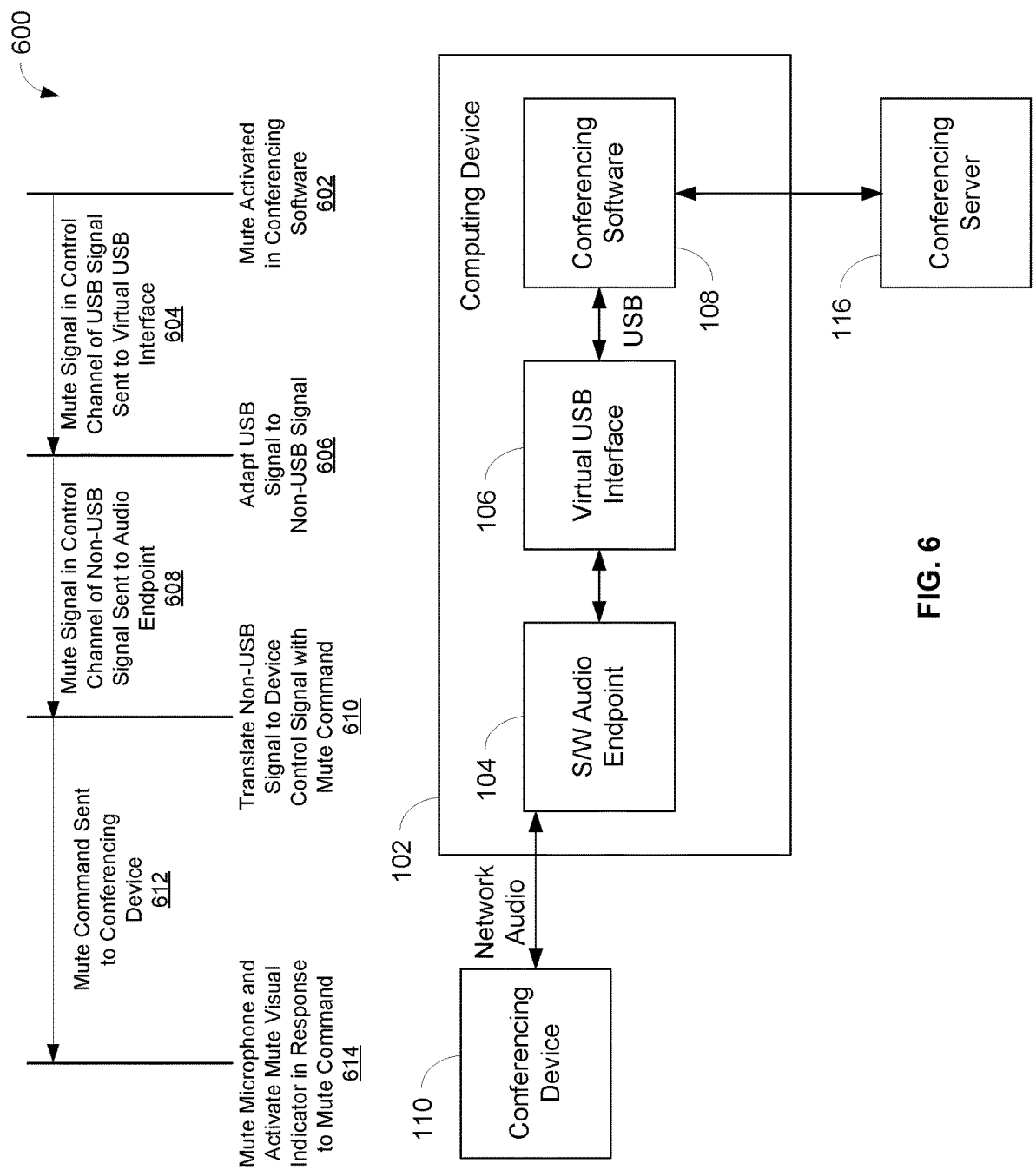
FIG. 6 is a diagram illustrating an exemplary signal flow between components of the conferencing system of FIG. 1, in accordance with some embodiments.

The conferencing system 100 may be implemented on the computing device 102, such as, e.g., a personal computer (PC), a laptop, a tablet, a mobile device, a smart device, thin client, or other computing platform. In some embodiments, the computing device 102 can be physically located in and/or dedicated to the conferencing environment (or room). In other embodiments, the computing device 102 can be part of a network or distributed in a cloud-based environment. In some embodiments, the computing device 102 may reside in an external network, such as a cloud computing network. In some embodiments, the computing device 102 may be implemented with firmware and/or be software-based. The computing device 102 may be part of a network, which may be accessed or otherwise communicated with, via another device, including other computing devices, such as, e.g., desktops, laptops, mobile devices, tablets, smart devices, etc. In embodiments, the computing device 102 can be any generic computing device comprising a processor and a memory device, for example, as shown in FIG. 6. The computing device 102 may include other components commonly found in a PC or laptop computer, such as, e.g., a data storage device, a native or built-in audio microphone device and a native audio speaker device.

The conferencing system 100 may further include the software audio endpoint 104, such as an application configured to operate on the computing device 102 and provide, for example, audio compression software, auto-mixing, DSP, acoustic echo cancellation, resource monitoring, licensing access, and various audio and/or control interfaces. The software audio endpoint 104 may leverage components or resources that already exist in the computing device 102 to provide a software-based product. The software audio endpoint 104 may be stored in a memory of the computing device 102 and/or may be stored on a remote server (e.g., on premises or as part of a cloud computing network) and accessed by the computing device 102 via a network connection. In one exemplary embodiment, the software audio endpoint 104 may be configured as a distributed cloud-based software with one or more portions of the software audio endpoint 104 residing in the computing device 102 and one or more other portions residing in a cloud computing network. In some embodiments, the software audio endpoint 104 resides in an external network, such as a cloud computing network. In some embodiments, access to the software audio endpoint 104 may be via a web-portal architecture, or otherwise provided as Software as a Service (SaaS). Embodiments of a software audio endpoint 104 are described in commonly assigned U.S. patent application Ser. No. 16/424,349 filed May 28, 2019 (U.S. Patent App. Pub. No. 2019/0385629), entitled "Systems and Methods for Integrated Conferencing Platform", which is hereby incorporated by reference in its entirety herein.

The conferencing system 100 may further include one or more conferencing devices 110 coupled to the computing device 102 via a cable or other connection (e.g., wireless), and which can be driven by the software audio endpoint 104. The conferencing device 110 may be any type of audio hardware that comprises microphones and/or speakers for facilitating a conference call, webcast, telecast, etc., such as a conferencing device, e.g., SHURE MXA310, MXA910, etc. For example, the conferencing device 110 may include one or more microphones for capturing near end audio signals produced by conference participants situated in the conferencing environment (e.g., seated around a conference table). The conferencing device 110 may also include one or more speakers for broadcasting far end audio signals received from conference participants situated remotely but connected to the conference through the conferencing software 108 or other far end audio source. In some embodiments, the conferencing system 100 can also include one or more audio output devices 112, separate from the conferencing device 110. Such audio output devices 112 may be any type of loudspeaker or speaker system and may be located in the conferencing environment for audibly outputting an audio signal associated with the conference call, webcast, telecast, etc. In embodiments, the conferencing device 110 and the audio output device 112 can be placed in any suitable location of the conferencing environment or room (e.g., on a table, lectern, desktop, ceiling, wall, etc.). In some embodiments, the conferencing device 110 and the audio output device 112 may be networked audio devices coupled to the computing device 102 via a network cable (e.g., Ethernet) or wirelessly, and be configured to handle digital audio signals. In other embodiments, these devices may be analog audio devices or another type of digital audio device. Audio hardware built-in or connected to the computing device 102, e.g., a speaker 114, may also audibly output an audio signal, and be driven by the software audio endpoint 104, such as through a native audio I/O driver.

The software audio endpoint 104 may communicate with the conferencing software 108 via the virtual USB interface 106. The conferencing software 108 may be internal, enterprise, proprietary, and/or third-party conferencing software (e.g., Microsoft Teams, Zoom, Skype, BlueJeans, Cisco WebEx, GoToMeeting, Join.me, etc.) that is stored and/or executable on the computing device 102. The virtual USB interface 106 may connect the software audio endpoint 104 to the conferencing software 108 in order to receive far end audio signals associated with a given conference call or meeting, and to transmit an audio output signal back to the far end participants via the conferencing software 108. As an example, the far end audio signals may be microphone signals captured by a conferencing device, mobile phone, camera, laptop, desktop computer, tablet, or other audio hardware device that is situated adjacent to the far end participants and is configured to communicatively connect to a conferencing server 116 associated with the conferencing software 108. The audio output signal may be broadcast to the far end participants via the same audio hardware device or a separate loudspeaker or other audio device. The audio output signal may include the audio signals received by the conferencing device 110 at the near end, for example. The virtual USB interface 106 may also connect the software audio endpoint 104 to the conferencing software 108 in order to receive and transmit control signals between the components, as described in more detail below.

Figure 2:
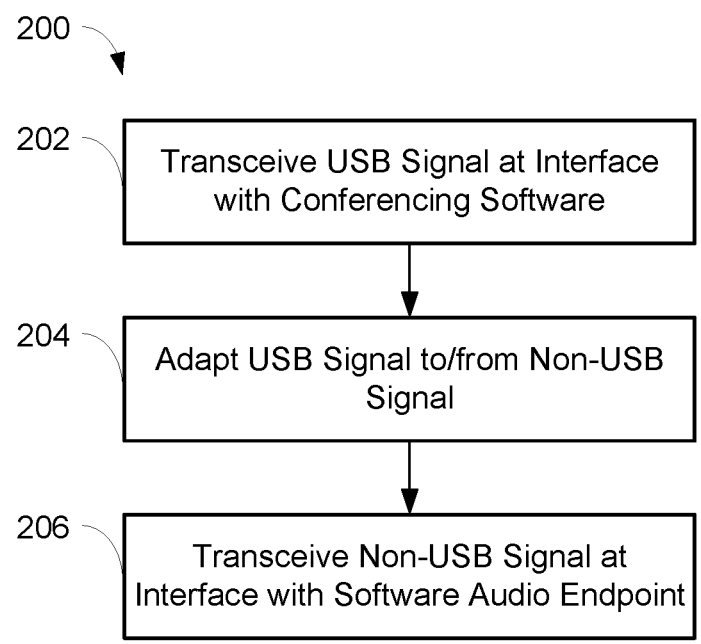
FIGS. 2-4 are flowcharts illustrating operations for a virtual USB interface usable in the conferencing systems of FIG. 1, in accordance with some embodiments.
Figure 3:
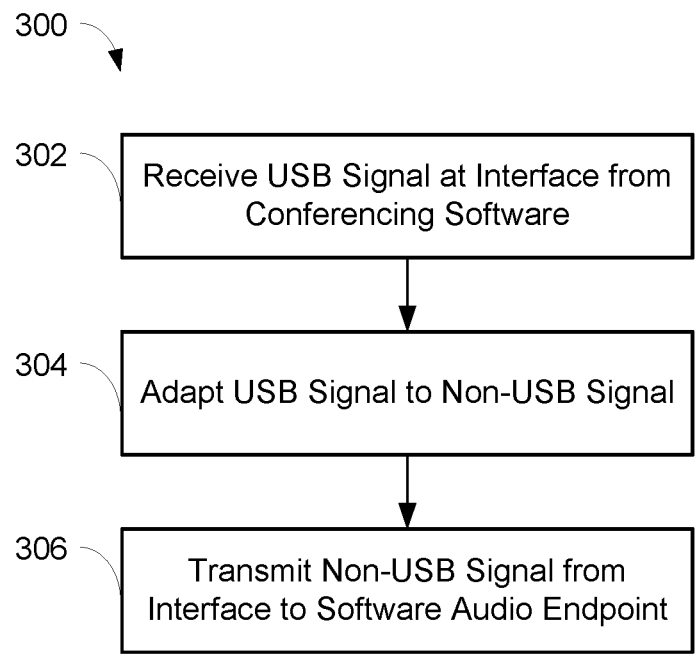
Figure 4:
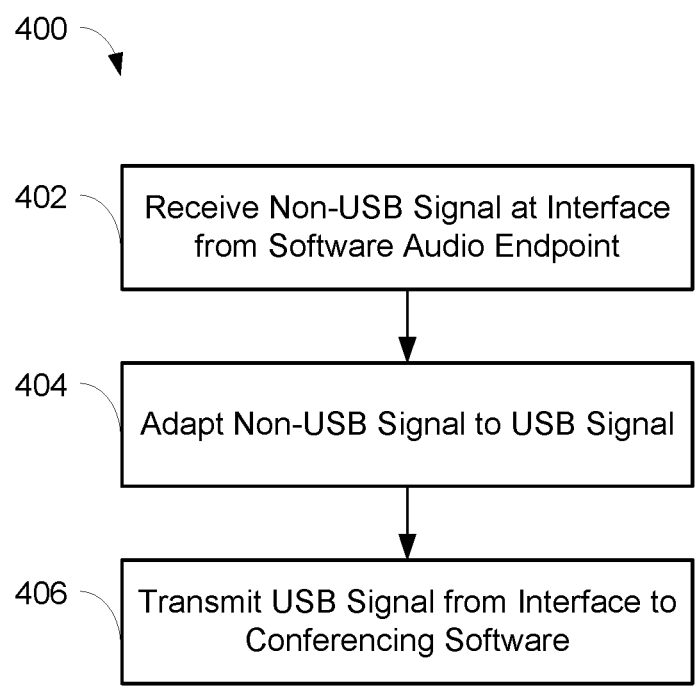

The virtual USB interface 106 may be a software component or module stored and executable by the computing device 102 for enabling the transceiving and adapting of USB and non-USB signals between the software audio endpoint 104 and the conferencing software 108. Embodiments of processes 200, 300, and 400 for the virtual USB interface 106 for the transceiving and adapting of USB and non-USB signals are shown in FIGS. 2, 3, and 4, respectively. One or more processors and/or other processing components (e.g., analog to digital converters, encryption chips, etc.) within or external to the computing device 102 may perform any, some, or all of the steps of the processes 200, 300, and 400. One or more other types of components (e.g., memory, input and/or output devices, transmitters, receivers, buffers, drivers, discrete components, etc.) may also be utilized in conjunction with the processors and/or other processing components to perform any, some, or all of the steps of the processes 200, 300, and 400.

A USB signal may be transceived between the virtual USB interface 106 and the conferencing software 108, such as at step 202 of the process 200 shown in FIG. 2. For example, a USB signal may be received at the virtual USB interface 106 from the conferencing software 108, and a USB signal may be transmitted from the virtual USB interface 106 to the conferencing software 108. The USB signal may be adapted to and from a non-USB signal, such as at step 204 of the process 200, and as described in more detail below. The non-USB signal may be transceived between the software audio endpoint 104 and the virtual USB interface 106, such as at step 206 of the process 200. For example, a non-USB signal may be transmitted from the virtual USB interface 106 to the software audio endpoint 104, and a non-USB signal may be received at the virtual USB interface 106 from the software audio endpoint 104.

The USB signal and the non-USB signal may each include one or more media channels, control channels, and/or combined media and control channels. The USB signal may be composed of packets, e.g., handshake packets, token packets, data packets, and/or start of frame packets, as is known in the art. The media channel of the USB signal may conform to a USB audio class, and may include, for example, a far end audio signal from the conferencing software 108 (e.g., for playback in the near end via the software audio endpoint 104), or a near end audio signal from the software audio endpoint 104 (e.g., for playback at the far end via the conferencing software 108). In embodiments, the media channel of the USB signal may conform to a USB video class.

In some examples, the virtual USB interface 106 may be configured to emulate an audio device. The emulated audio device may be configured with a particular sampling rate, such as a mono and/or stereo device with a 48 kHz sampling rate, and a 16 or 24-bit sampling depth, etc. However, while the virtual USB interface 106 may have a specified or desired sampling rate, the actual or effective sampling rate of the virtual USB interface 106 may in fact vary over time, e.g., due to differences in system architectures, and operating system task scheduling algorithms, system processing loads, clocks provided by an operating system—etc.

In some cases, network audio devices may be coupled to the virtual USB interface 106, and the virtual USB interface 106 may output audio data to, and/or receive audio data from such audio devices. The coupled audio devices may be synchronized based on a common clock, such as a Precision Time Protocol (PTP) clock. In cases where there is no DSP application that intermediates between the virtual USB interface 106 and the commonly-clocked audio devices, the virtual USB interface 106 may also be clocked according to or based on the common clock of the audio devices. That is, the common clock may be passed through to the virtual USB interface 106 and may be used as the clock for the virtual USB interface 106.

In some other examples, an application (such as a DSP application) may act as an intermediary between the virtual USB interface 106 and one or more audio devices that may be commonly-clocked (e.g., according to a protocol such as PTP). These networked audio devices may also have their own specified or desired sampling rate that may be derived based off of the common clock of those audio devices. For example, a networked speaker may have a desired sampling rate of 48 kHz. However, the actual or sampling rate of these devices in practice, such as a networked speaker or microphone sampling rate, may also vary or drift over time. For instance, the networked audio interface may have a sampling rate that may drift from 47.7 kHz to 48 kHz, as one possible example. And, such a networked audio interface may have a clock rate that differs from the clock rate of the virtual USB interface 106. Thus, the sampling rates of the virtual USB interface 106 and other audio devices in communication therewith may both vary, effectively producing different clocking domains that may be likely to be out of sync. The difference between these samples rates may result in buffer XRUN (e.g., overrun or underrun) when writing to or reading from a buffer of the virtual USB interface 106 that may be used to bridge audio samples between such different clocking domains. Accordingly, various techniques may be utilized to avoid buffer XRUN and to deal with such differing clock domains.

According to some embodiments, one such technique may attempt to account for the varying sampling rate of the virtual USB interface 106 in various manners. The virtual USB interface 106 may receive audio samples at a varying rate. For example, the virtual USB interface 106 may not receive audio samples at a constant rate of 48 kHz. The virtual USB interface 106 may write a packet comprising a given number (e.g., 480) of samples (representing, e.g., 10 milliseconds) to a buffer, such as a ring buffer, based on receiving such USB packets from a USB audio driver, audio data for which may originate from the conferencing software 108. After receiving a packet, the virtual USB interface 106 may determine whether the packet is the start of a new iteration of the clock rate monitoring function. If the current packet does mark a new iteration, the current time may be saved as the start time of the current iteration. Regardless of whether a new iteration has begun, the virtual USB interface 106 may increment a total number of samples by the number of samples received in the packet, e.g., 480 samples, and may record the amount of time that has elapsed in the current iteration.

As part of the clock rate monitoring function, the virtual USB interface 106 may determine an amount of samples that are expected to have been written to the buffer during the elapsed time. If the expected number of written samples is greater than a threshold number of samples (e.g., 480 samples), the virtual USB interface 106 may write an additional packet of samples into the audio ring buffer to account for the lower-than-expected number of samples as compared to the sampling rate. According to some examples, the function of determining an elapsed time, determining a number of samples that have been written over an elapsed amount of time, and determining whether to write another packet to a buffer based on the number of samples that have been written, is described in the below pseudocode:

1. Conferencing application sends USB packets to virtual USB interface 106. Each packet has 480 samples, which represents 10 msec of data.
2. After receiving 480 samples, the virtual USB interface 106 determines whether the most recently received packet is a start packet (e.g., the start of an iteration).
3. If the most recently received packet is a start packet, the virtual USB interface 106 saves the current time (stored in a variable named "CurrentTime") as the start time in a variable named "StartTime." Each unit of time may represent 100 nanoseconds.
4. The virtual USB interface 106 calculates totalSum-Samples, a variable that represents the total number of samples that have been received during a current iteration. totalSumSamples is calculated by adding 480 to itself, e.g., total Sum Samples+=480.
5. The value of the variable elapsedTime is calculated, where elapsedTime=CurrentTime−StartTime.
6. The value of nominalSamples (the number of expected samples to have received at this point, based on a 48 kHz sampling rate) is determined as: nominalSamples=48000*elapsedTime.
7. If the number of expected samples minus the number of currently received samples is less than a threshold, e.g., if ((nominalSamples−totalSumSamples)>480), the virtual USB interface 106 will send another packet of 480 samples to be written to the ring buffer.

For cases in which audio data is being received from a microphone, the virtual USB interface 106 may perform a similar process to that described above with respect to outputting audio, but in reverse. For example, the virtual USB interface 106 may receive microphone audio samples from software audio endpoint 104. The audio samples may not be received at a constant rate, e.g., at a sampling rate that may drift over time. The software audio endpoint 104 may store packets comprising the audio samples into a buffer, such as a ring buffer or FIFO buffer at an approximate rate, e.g., 48 kHz. To account for variations in the sampling rate from the software audio endpoint 104, if an insufficient number of samples are received to meet the expected/desired sampling rate, the virtual USB interface 106 may write an additional audio data packet to the recording buffer. Additionally, the virtual USB interface 106 may read audio packets out from the recording buffer to the conferencing software 108, which may playback the received audio samples.

Alternatively or additionally to the technique described in pseudocode described above, various other techniques that may involve altering the sampling rate of the virtual USB interface 106 may be used to match the clock rate of the virtual USB interface 106 to the clock rate of the external audio devices. As an example, the sampling rate of the virtual USB interface 106 may be generally controlled by a high-precision timer that generates interrupts at an interval, such as 10 msec by default. The virtual USB interface 106 may compare the clock rate of the external audio devices, and may adjust the timeout of the virtual USB interface 106 to more closely match the clock rate of the external audio devices. For example, the virtual USB interface 106 may monitor the external clock rate of the audio devices periodically, e.g., every 30 seconds, to determine a current external clock rate. If the current external clock rate has decreased, the timeout of the virtual USB interface 106, which may define the rate at which audio samples are received from the operating system USB audio driver, may be increased. Similarly, if the current external clock rate has increased, the virtual USB interface 106 may lower the timeout, resulting in an increased rate of sampling from the operating system USB audio driver. In some further examples, the precision of the operating system-provided timer may not be precise enough to precisely adjust the sampling rate of the virtual USB interface 106, so polling of the CPU time may be used as an alternative to, or in addition to, the timeout adjustment techniques described above.

The control channel of the USB signal may conform to a USB Human Interface Device (HID) class, and include signals for monitoring and controlling functionality such as muting, volume, off hook (answering a call), on hook (ending a call), light indicators, the type and/or capabilities of the software audio endpoint 104 and/or the conferencing software 108, etc. In embodiments, the control channel of the USB signal may include other types of signals, such as signals related to firmware and software updates of the software audio endpoint 104, or other standard USB-compliant signals.

The non-USB signal may be any type of signal that does not conform to the USB standard, may be packetized or non-packetized, and/or may be structured or unstructured. In embodiments, the non-USB signal may generally be a non-standards-based signal that is compatible with or can be understood by the software audio endpoint 104. The media channel of the non-USB signal may be a pulse code modulation (PCM) audio data stream, in embodiments. In other embodiments, the media channel of the non-USB signal may be a compressed audio data stream (e.g., OPUS), a video data stream, etc. The media channel of the non-USB signal may include, for example, a near end audio signal from the software audio endpoint 104 (e.g., for playback at the far end via the conferencing software 108), or a far end audio signal from the conferencing software 108 (e.g., for playback in the near end by the software audio endpoint 104).

The control channel of the non-USB signal may conform to an application programming interface (API) of the software audio endpoint 104, in embodiments. The control channel of the non-USB signal may include signals for monitoring and controlling functionality such as muting, volume, off hook (answering a call), on hook (ending a call), call status, the type and/or capabilities of the software audio endpoint 104 and/or the conferencing software 108, etc.

An audio signal of the media channel of the USB signal and/or the non-USB signal may include any type of audio, such as single channel monaural audio and/or multi-channel audio (e.g., stereo, surround sound, etc.). The control channel of the USB signal and/or the non-USB signal may include any suitable type of data, such as metadata related to a conference call (e.g., participant names, locations, length of a call, etc.).

The virtual USB interface 106 may be configured to receive a USB signal from the conferencing software 108, such as at step 302 of the process 300 shown in FIG. 3. The received USB signal may be adapted and converted by the virtual USB interface 106 to a non-USB signal, such as at step 304. At step 306, the non-USB signal may be transmitted by the virtual USB interface 106 to the software audio endpoint 104. In embodiments, the virtual USB interface 106 may adapt the USB signal to the non-USB signal by depacketizing the USB signal. For example, the virtual USB interface 106 may receive and process the packets of the USB signal to generate the non-USB signal that is compatible with or used by the software audio endpoint 104.

In particular, the media channel of the USB signal may be adapted by the virtual USB interface 106 into the media channel of the non-USB signal, such as into an audio signal (e.g., PCM audio data stream) that is compatible with or used by the software audio endpoint 104. The control channel of the USB signal may be adapted by the virtual USB interface 106 into the control channel of the non-USB signal, such as into a control signal that is compatible with or used by the software audio endpoint 104. In embodiments, the virtual USB driver 106 may also adapt the USB signal by changing a compression of the media channel; changing a bitrate of the media channel; changing a sampling rate of the media channel; synchronizing clocks used by the software audio endpoint 104, the virtual USB driver 106, and/or the conferencing software 108; and/or encrypting or decrypting the media channel and/or the control channel, for example.

The virtual USB interface 106 may also be configured to receive a non-USB signal from the software audio endpoint 104, such as at step 402 of the process 400 shown in FIG. 4. The received non-USB signal may be adapted and converted by the virtual USB interface 106 to a USB signal, such as at step 404. At step 406, the USB signal may be transmitted by the virtual USB interface 106 to the conferencing software 108. In embodiments, the virtual USB interface 106 may adapt the non-USB signal to the USB signal by packetizing the non-USB signal. For example, the virtual USB interface 106 may receive and process the non-USB signal by formatting packets of the USB signal that are compatible with or used by the conferencing software 108.

In particular, the media channel of the non-USB signal may be adapted by the virtual USB interface 106 into the media channel of the USB interface, such as into a signal conforming to a USB audio class that is compatible with or used by the conferencing software 108. The control channel of the non-USB signal may be adapted by the virtual USB interface 106 into the control channel of the USB signal, such as into a signal conforming to the USB HID class that is compatible with or used by the conferencing software 108. In some examples, audio signals may be adapted to/from a USB ISOCHRONOUS packet transfer type. In embodiments, the virtual USB driver 106 may also adapt the non-USB signal by changing a compression of the media channel; changing a bitrate of the media channel; changing a sampling rate of the media channel; synchronizing clocks used by the software audio endpoint 104, the virtual USB driver 106, and/or the conferencing software 108; and/or encrypting or decrypting the media channel and/or the control channel, for example.

In embodiments, the virtual USB interface 106 may include a data structure, such as a ring buffer or FIFO buffer, to temporarily store data from audio signals received from the software audio endpoint 104 and/or the conferencing software 108. Such a data structure may buffer the audio data since the software audio endpoint 104 or the conferencing software 108 may transmit or receive the audio signals at different rates.

In some examples, such a ring buffer may be implemented within the kernel space of the USBaudio.sys or USBaudio2.sys driver that is used to instantiate the virtual USB interface 106. The buffer size may generally be kept to a small size (e.g., 4096 audio samples as one possibility) in order to reduce audio latency, as larger buffer sizes may increase audio latency when reading from and/or writing to the buffer. When audio samples are read from the ring buffer, space in the ring buffer may be freed, and when samples are written to the buffer, space in the ring buffer may be claimed (e.g., occupied).

The virtual USB interface 106 may appear as a USB composite class device to the conferencing software 108 so that a USB connection can be made between the virtual USB interface 106 and the conferencing software 108. The conferencing software 108 can therefore communicate audio and control signals with the software audio endpoint 104 as if the software audio endpoint 104 were a USB device, through adaptation by the virtual USB interface 106. In this way, the conferencing software 108 may transmit and receive USB signals to and from the software audio endpoint 104 (through the virtual USB interface 106), akin to how the conferencing software 108 may transmit and receive USB signals to and from a hardware audio endpoint. In some examples, the virtual USB interface 106 may appear to the conferencing software as the corresponding physical device that is being emulated. For instance, the virtual USB interface 106 may appear as a speaker, audio interface, microphone, DSP, etc., such as Shure P300, MXU320, ANIUSB, etc. The virtual USB interface 106 thus allows the conferencing software 108 to be used without changes since it can connect to the software audio endpoint 104 through a USB connection.

In addition, it can be beneficial for the conferencing software 108 to know the type and/or capabilities of the software audio endpoint 104, and vice versa, through the use of the virtual USB interface 106. For example, the control channel of the USB signal that conforms to the USB HID class can include an identification of the type and/or capabilities of the software audio endpoint 104, such as that the software audio endpoint 104 has acoustic echo cancellation or digital signal processing functionality. When the conferencing software 108 receives such an identification, the conferencing software 108 may disable its native acoustic echo cancellation or native digital signal processing, in deference to the software audio endpoint 104. In this way, redundant functionality and processing can be avoided.

FIG. 6 is a diagram illustrating an exemplary signal flow 600 between components of the conferencing system 100 of FIG. 1. The signal flow 600 describes an example of the various signals generated and actions performed by the conferencing software 108, the virtual USB interface 106, the software audio endpoint 104, and the conferencing device 110, when a muting of a conference or meeting originates at the conferencing software 108. At step 602, a mute may be activated in the conferencing software 108, such as by a user who desires to mute the conferencing device 110. In response, at step 604, a mute signal within a USB signal may be sent from the conferencing software 108 to the virtual USB interface 106. The mute signal may be included in a control channel of the USB signal. In addition, the conferencing software 108 may activate a visual indicator to signify the muting state (e.g., showing a mute icon on a display connected to the computing device 102). The virtual USB interface 106 may adapt the received USB signal to a non-USB signal, such as at step 606. The adaptation of the USB signal may include generating a control channel of the non-USB signal that includes the mute signal.

In some examples, the mute signal may be synchronized by the virtual USB interface 106 between the conferencing software 108 and the software audio endpoint 104. The synchronization of the mute signal may be based on synchronization signals that may be sent and/or received by an interface of the virtual USB interface 106. In some examples, the virtual USB interface 106 may comprise one or more descriptors, such as one or more "iInterface" descriptors. Such descriptors may be string values that describe an audio endpoint. Based on the particular conferencing software 108 (e.g., Microsoft Teams, Zoom, etc.), a mute synchronization command may be sent based on one or more values of an endpoint, such as an "iInterface" string or "iTerminal" string.

The non-USB signal (with the mute signal in its control channel) may be sent from the virtual USB interface 106 to the software audio endpoint 104 at step 608. After receiving the non-USB signal from the virtual USB interface 106, at step 610, the software audio endpoint 104 may translate the mute signal in the control channel of the non-USB signal to a device control signal including a mute command. The mute command may be sent from the software audio endpoint 104 to the conferencing device 110 at step 612, such as over a control channel on a network connection. In response to receiving the mute command, the conferencing device 110 at step 614 may activate a visual indicator to signify the muting state (e.g., turning on a red LED).

FIG. 7 is a diagram illustrating an exemplary signal flow 700 between components of the conferencing system 100 of FIG. 1. The signal flow 700 describes an example of the various signals generated and actions performed by the conferencing device 110, the software audio endpoint 104, the virtual USB interface 106, and the conferencing software 108, when a muting of a conference or meeting originates at the conferencing device 110. At step 702, a mute may be activated on the conferencing device 110, such as by a user who desires to mute the conferencing device 110 by pressing a physical mute button. In response, at step 704, a mute command may be sent from the conferencing device 110 to the software audio endpoint 104, such as over a control channel on a network connection. In addition, the conferencing device 110 may activate a visual indicator to signify the muting state (e.g., turning on a red LED). After receiving the mute command from the conferencing device 110, the software audio endpoint 104 may translate the mute command to a non-USB signal with a mute signal in its control channel.

The non-USB signal may be sent from the software audio endpoint 104 to the virtual USB interface 106 at step 708. The virtual USB interface 106 may adapt the received non-USB signal to a USB signal, such as at step 710. The adaptation of the non-USB signal may include generating a control channel of the USB signal that includes a mute signal. The USB signal with the mute signal in its control channel may be sent from the virtual USB interface 106 to the conferencing software 108. In response to receiving the USB signal with the mute signal, the conferencing software 108 at step 714 may activate a visual indicator to signify the muting state (e.g., showing a mute icon on a display connected to the computing device 102).

In an embodiment, the operating system of the computing device 102 may include a driver that handles communications in the kernel space between the virtual USB interface 106 and the conferencing software 108. In this embodiment, the virtual USB interface 106 may communicate with the driver in order to transceive USB signals to and from the conferencing software 108. In this embodiment, the virtual USB interface 106 may present itself as a USB device to the driver of the operating system, and the conferencing software 108 may connect to the driver in order to communicate with the virtual USB interface 106 (and ultimately the software audio endpoint 104). The driver may be an audio driver, a video driver, a media driver, a control driver, or other appropriate driver of the operating system of the computing device 102. For example, in the Windows operating system, the driver may be the usbaudio.sys driver for audio signals and/or may be the usbhid.sys driver for control signals. As another example, in the macOS operating system, the driver may be the Core Audio Framework with an Audio Server plug-in for audio signals, and/or may be the IOKit and the IOHIDUserDevice Framework for control signals.

In embodiments, other standards-based communications signals may be adapted by a virtual adaptation interface to and from another type of communications signal. The standards-based communications signal (e.g., TCP/IP packets) may include, for example, control signals for control of a human interface device. Accordingly, such a virtual adaptation interface may adapt the standards-based communications signal into a suitable format that is compatible with or usable by a component that does not normally utilize the standards-based communications signal, and vice versa.

Figure 5:
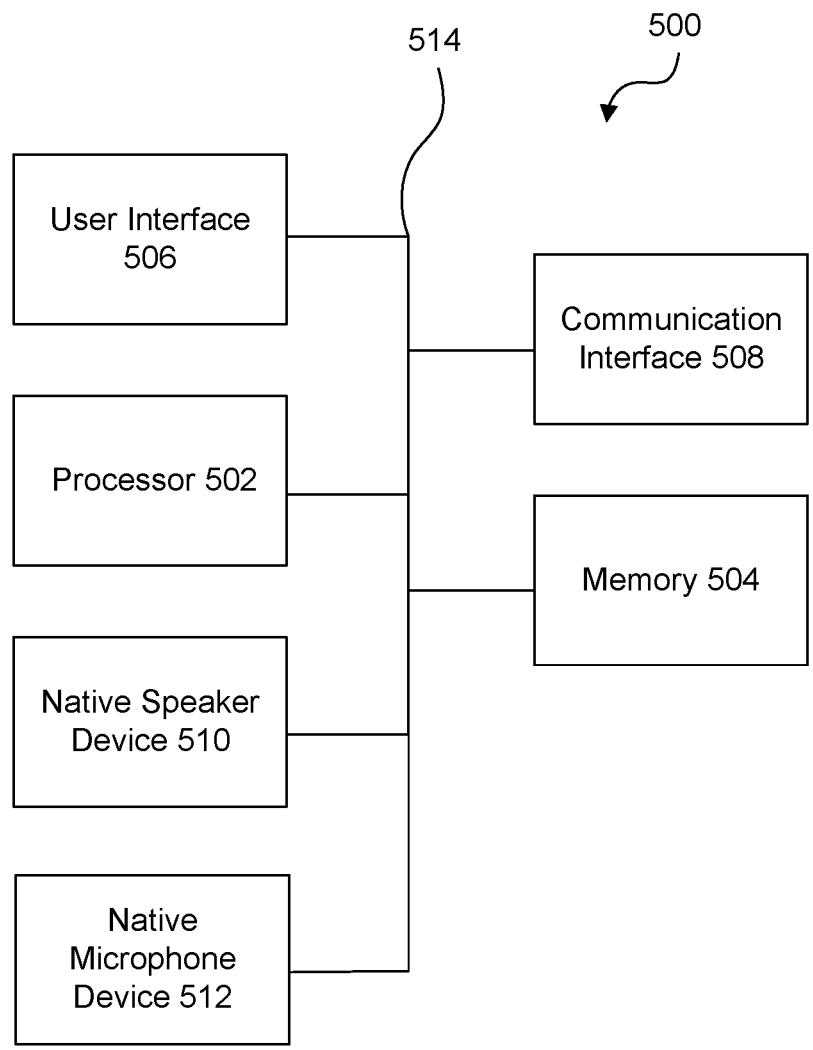
FIG. 5 is a block diagram illustrating an exemplary computing device of the conferencing systems of FIG. 1, in accordance with some embodiments.

FIG. 5 illustrates a simplified block diagram of an exemplary computing device 500 of the conferencing system 100. In embodiments, one or more computing devices like computing device 500 may be included in the conferencing system 100 and/or may constitute the computing device 102. The computing device 500 may be configured for performing a variety of functions or acts, such as those described in this disclosure (and shown in the accompanying drawings).

Various components of the conferencing system 100, and/or the subsystems included therein, may be implemented using software executable by one or more computers, such as a computing device with a processor and memory (e.g., as shown in FIG. 5), and/or by hardware (e.g., discrete logic circuits, application specific integrated circuits (ASIC), programmable gate arrays (PGA), field programmable gate arrays (FPGA), etc.). For example, some or all components may use discrete circuitry devices and/or use a processor (e.g., audio processor and/or digital signal processor) executing program code stored in a memory, the program code being configured to carry out one or more processes or operations described herein. In embodiments, all or portions of the processes may be performed by one or more processors and/or other processing devices (e.g., analog to digital converters, encryption chips, etc.) within or external to the computing device 500. In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the operations described herein. For example, program code stored in a memory of the system 100 may be executed by an audio processor in order to carry out one or more operations shown in the processes 200, 300, and 400 shown in FIGS. 2-4.

According to embodiments, the computing device 500 may be a smartphone, tablet, laptop, desktop computer, small-form-factor (SFF) computer, smart device, or any other computing device that may be communicatively coupled to one or more microphones and one or more speakers in a given conferencing environment. In some examples, the computing device 500 may be stationary, such as a desktop computer, and may be communicatively coupled to microphone(s) and/or speakers that are separate from the computer (e.g., a standalone microphone and/or speaker, a microphone and/or speaker of a conferencing device, etc.). In other examples, the computing device 500 may be mobile or non-stationary, such as a smartphone, tablet, or laptop. In both cases, the computing device 500 may also include a native microphone device 512 and/or a native speaker device 510.

The computing device 500 may include various components, including for example, a processor 502, memory 504, user interface 506, communication interface 508, native speaker device 510, and native microphone device 512, all communicatively coupled by system bus, network, or other connection mechanism 514. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, one or more features of the computing device 500 may be physically remote (e.g., a standalone microphone) and may be communicatively coupled to the computing device, via the communication interface 508, for example.

The processor 502 may include a general purpose processor (e.g., a microprocessor) and/or a special purpose processor (e.g., a digital signal processor (DSP)). The processor 502 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 504 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 504 includes multiple kinds of memory, particularly volatile memory and non-volatile memory.

The memory 504 may be computer readable media on which one or more sets of instructions, such as the software for operating the methods of the present disclosure, the software audio endpoint 104, the virtual USB interface 106, and/or the conferencing software 108, can be embedded. The instructions may embody one or more of the methods or logic as described herein. As an example, the instructions can reside completely, or at least partially, within any one or more of the memory 504, the computer readable medium, and/or within the processor 502 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The user interface 506 may facilitate interaction with a user of the device. As such, the user interface 506 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 506 may also comprise devices that communicate with inputs or outputs, such as a short-range transceiver (RFID, Bluetooth, etc.), a telephonic interface, a cellular communication port, a router, or other types of network communication equipment. The user interface 506 may be internal to the computing device 500, or may be external and connected wirelessly or via connection cable, such as through a universal serial bus port.

The communication interface 508 may be configured to allow the computing device 500 to communicate with one or more devices (or systems) according to one or more protocols. In one example, the communication interface 508 may be a wired interface, such as an Ethernet interface or a high-definition serial-digital-interface (HD-SDI). As another example, the communication interface 508 may be a wireless interface, such as a cellular, Bluetooth, or WI-FI interface.

The data bus 514 may include one or more wires, traces, or other mechanisms for communicatively coupling the processor 502, memory 504, user interface 506, communication interface 508, native speaker 510, native microphone 512, and/or any other applicable computing device component.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method executable on a computing device, comprising:
receiving a first signal conforming to a Universal Serial Bus (USB) standard at a virtual USB interface from conferencing software executable on the computing device and configured to be in communication with a conferencing device to allow communication between a near end and a far end;
adapting, using the virtual USB interface executable on the computing device, the first signal conforming to the USB standard to a first non-USB signal; and
transmitting the first non-USB signal from the virtual USB interface to audio processing software executable on the computing device and comprising a software audio endpoint, wherein the audio processing software comprises an acoustic echo cancellation component.

2. The method of claim 1, further comprising:
receiving a second non-USB signal at the virtual USB interface from the audio processing software;
adapting, using the virtual USB interface, the second non-USB signal to a second signal conforming to the USB standard; and
transmitting the second signal conforming to the USB standard from the virtual USB interface to the conferencing software.

3. The method of claim 1, wherein the first signal conforming to the USB standard comprises one or more of a media channel or a control channel.

4. The method of claim 3, wherein the media channel of the first signal conforming to the USB standard comprises an audio signal from the conferencing software.

5. The method of claim 3,
wherein the media channel of the first signal conforming to the USB standard conforms to a USB audio class; and
wherein the control channel of the first signal conforming to the USB standard conforms to a USB Human Interface Device (HID) class.

6. The method of claim 1, wherein the first non-USB signal comprises one or more of a media channel, a control channel, or a combined media and control channel.

7. The method of claim 6,
wherein the media channel of the first non-USB signal comprises a pulse code modulation (PCM) audio data stream; and
wherein the control channel of the first non-USB signal comprises a signal conforming to an application programming interface (API).

8. The method of claim 1, wherein the virtual USB interface is configured to appear as a USB composite class device to the conferencing software.

9. The method of claim 1,
wherein adapting the first signal conforming to the USB standard to the first non-USB signal comprises adapting the first signal conforming to the USB standard to the first non-USB signal such that the conferencing software communicates with the software audio endpoint as a USB device.

10. The method of claim 1, wherein adapting the first signal conforming to the USB standard to the first non-USB signal comprises one or more of:
changing a compression of a media channel included in the first signal conforming to the USB standard;
changing a bitrate of the media channel included in the first signal conforming to the USB standard; or
encrypting or decrypting one or more of the media channel or a control channel included in the first signal conforming to the USB standard.

11. The method of claim 1, wherein receiving the first signal conforming to the USB standard comprises:
writing audio samples to a buffer; and
writing, based on a number of the audio samples that have been written to the buffer in a given time period, additional audio samples to the buffer.

12. The method of claim 1,
wherein the first signal conforming to the USB standard is received, with a buffer, at a first clock rate; and
wherein transmitting the first non-USB signal from the virtual USB interface comprises reading data from the buffer at a second clock rate that is different than the first clock rate.

13. The method of claim 12, further comprising:
adjusting the first clock rate to converge to the second clock rate, wherein the first clock rate is associated with the virtual USB interface.

14. A computing device, comprising:
at least one processor configured to:
receive a first non-Universal Serial Bus (USB) signal from audio processing software comprising a software audio endpoint, wherein the audio processing software comprises an acoustic echo cancellation component;
adapt the first non-USB signal to a first signal conforming to a USB standard; and
transmit the first signal conforming to the USB standard to conferencing software configured to be in communication with a conferencing device to allow communication between a near end and a far end.

15. The computing device of claim 14, wherein to receive the first non-USB signal from the audio processing software, the at least one processor is further configured to:
write, to a buffer, audio samples received from the audio processing software; and
write, based on a number of the audio samples that have been written to the buffer in a given time period, additional audio samples to the buffer.

16. The computing device of claim 14,
wherein the first non-USB signal from the audio processing software is received, with a buffer, at a first clock rate, and
wherein to transmit the first signal conforming to the USB standard to the conferencing software, the at least one processor is further configured to:
read data from the buffer at a second clock rate that is different than the first clock rate; and
transmit, at the second clock rate and to the conferencing software, the data that is read from the buffer.

17. The computing device of claim 16, wherein the at least one processor is further configured to:
adjust the second clock rate to converge to the first clock rate.

18. The computing device of claim 14, wherein the at least one processor is further configured to:
receive a second signal conforming to the USB standard from the conferencing software;
adapt the second signal conforming to the USB standard to a second non-USB signal; and
transmit the second non-USB signal to the audio processing software.

19. The computing device of claim 14, wherein the first signal conforming to the USB standard comprises one or more of a media channel or a control channel.

20. The computing device of claim 19,
wherein the media channel of the first signal conforming to the USB standard conforms to a USB audio class; and
wherein the control channel of the first signal conforming to the USB standard conforms to a USB Human Interface Device (HID) class.

21. The computing device of claim 14, wherein the first non-USB signal comprises one or more of a media channel, a control channel, or a combined media and control channel.

22. The computing device of claim 21, wherein the media channel of the first non-USB signal comprises an audio signal from the conferencing device in communication with the audio processing software.

23. The computing device of claim 21,
wherein the media channel of the first non-USB signal comprises a pulse code modulation (PCM) audio data stream; and
wherein the control channel of the first non-USB signal comprises a signal conforming to an application programming interface (API).

24. The computing device of claim 14,
wherein the at least one processor is configured to adapt the first non-USB signal to the first signal conforming to the USB standard such that the conferencing software communicates with the software audio endpoint as a USB device.

25. The computing device of claim 14, wherein the at least one processor is configured to adapt the first non-USB signal to the first signal conforming to the USB standard by performing one or more of:
changing a compression of a media channel included in the first non-USB signal;
changing a bitrate of the media channel included in the first non-USB signal; or
encrypting or decrypting one or more of the media channel or a control channel included in the first non-USB signal.

26. A conferencing system, comprising:
one or more processors; and
one or more conferencing devices configured to capture and play sound;
wherein the one or more processors are configured to:
receive, at conferencing software from at least one remote server, a remote audio signal, wherein the conferencing software is configured to be in communication with the one or more conferencing devices to allow communication between a near end and a far end;
receive, at a virtual Universal Serial Bus (USB) interface from the conferencing software, a signal conforming to a USB standard, wherein the signal conforming to the USB standard comprises the remote audio signal;
adapt, using the virtual USB interface, the signal conforming to the USB standard to a non-USB signal;
transmit, from the virtual USB interface to audio processing software, the non-USB signal, wherein the audio processing software comprises a software audio endpoint;
process, using the audio processing software, the non-USB signal into an audio signal; and
transmit, from the audio processing software to the one or more conferencing devices, the audio signal to cause the one or more conferencing devices to play the sound of the audio signal.

27. The method of claim 1, wherein the conferencing software is configured to be in communication with the conferencing device over a network connection.

28. The computing device of claim 14, wherein the conferencing software is configured to be in communication with the conferencing device over a network connection.

* * * * *